3,022,298
DIOXAZINE DYESTUFFS
Rudolf Mory, Dornach, and Christoph Frey, Basel, Switzerland, assignors to Ciba Limited, Basel, Switzerland
No Drawing. Filed May 2, 1958, Ser. No. 732,432
Claims priority, application Switzerland May 29, 1957
5 Claims. (Cl. 260—246)

The present invention provides new dioxazine dyestuffs which are free from groups imparting solubility in water and correspond to the general formula (1)

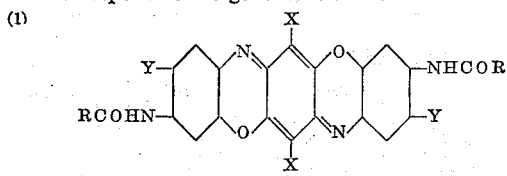

in which R represents a substituted benzene radical or an aromatic radical containing at least two condensed rings, and X and Y represent hydrogen atoms or substituents.

The invention also provides a process for the manufacture of the above dyestuffs, wherein (a) a compound of the formula (2)

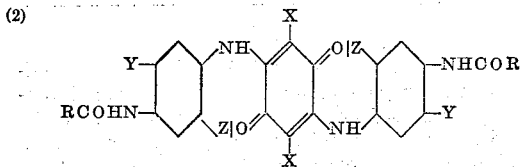

in which R, X and Y have the above meanings, and Z represents a hydrogen atom or an alkoxy group, is treated with a non-sulfonating condensing agent, or (b) a dioxazine of the general formula (3)

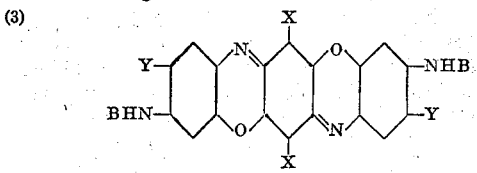

in which X and Y have the above meanings, and B represents a hydrogen atom or the radical of an aliphatic carboxylic acid containing at most 4 carbon atoms, is reacted with a reactive derivative of a substituted benzoic acid or of an aromatic carboxylic acid containing at least two condensed rings, and the starting materials used are free from groups imparting solubility in water.

The compounds of Formula 2 used as starting materials are advantageously prepared by condensing 1 molecular proportion of a para-benzoquinone with 2 molecular proportions of an amine of formula (4)

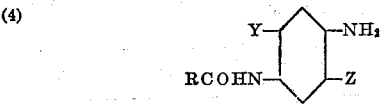

in which R, Y and Z have the above meanings, or by reducing a compound of the formula (5)

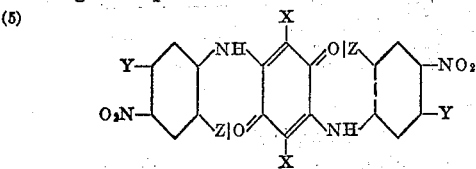

to the diamino compound and subsequent acylation; for this purpose the conditions under which the acylation is conducted may be selected so that the acylation and the subsequent ring closure to the dioxazine can be carried out in one operation. Those compounds of Formula 3 in which B represents a hydrogen atom can be made by reducing the appropriate dinitro compounds, while those compounds of Formula 3 in which B stands for an aliphatic acyl radical are obtainable by subjecting to condensation a compound of Formula 2 in which R represents alkyl radicals.

Owing to their ready accessibility, those compounds of Formulae 2 and 3 are especially suitable as starting materials for the present process, in which both X's represent chlorine atoms, and Y is preferably a hydrogen atom, a halogen atom (for example a chlorine atom), an alkyl group, or more especially an alkoxy group (for example, a methoxy or ethoxy group), R represents the radical of a substituted benzene-carboxylic acid or of an at least bicyclic aryl-carboxylic acid. The benzene radical may advantageously contain the following substituents: halogen atoms, more especially chlorine or bromine atoms; alkoxy groups, more especially methoxy groups; alkyl groups, for example methyl groups; aryl groups such as phenyl groups; also cyano, nitro or acylamino groups. As examples there may be mentioned the radicals of the following benzene carboxylic acids:

4-methyl-benzene carboxylic acid,
2-fluoro-benzene carboxylic acid,
2-chloro-benzene carboxylic acid,
4-chloro-benzene carboxylic acid,
2:4-dichloro-benzene carboxylic acid,
2:5-dichloro-benzene carboxylic acid,
4-bromo-benzene carboxylic acid,
4-phenyl-benzene carboxylic acid,
4-methoxy-benzene carboxylic acid,
3-methoxy-benzene carboxylic acid,
4-cyano-benzene carboxylic acid, or
4-nitro-benzene carboxylic acid.

As examples of carboxylic acid radicals that contain at least two condensed rings there may be mentioned the radicals of 1- or 2-naphthoic acid.

The oxazine ring closure is carried out by treating the specified starting materials with non-sulfonating condensing agents such, for example, as Friedel-Crafts catalysts such as aluminum chloride or ferric chloride, and more especially aromatic acid chlorides, for example benzoyl chloride or naphthoyl chloride, benzotrichloride or benzene sulfonyl chloride. It has been found particularly advantageous to use the chloride of the carboxylic acid which forms the acyl radical of the starting material. The reaction is advantageously conducted in a high boiling inert organic solvent, for example in nitrobenzene, mono-, di- or trichlorobenzene, naphthalene or α-chloronaphthalene, at an elevated temperature. The reaction proceeds particularly smoothly and rapidly with those compounds of Formula 2 in which Z represents an alkoxy group. When the selected starting material is a compound of the Formula 2 in which Z represents a hydrogen atom, the reaction takes longer, and in such a case it is found advantageous also to use an oxidating agent such as sodium nitrite or dinitrophenol, or an oxidating solvent such, for example, as nitrobenzene.

In the form of the present process mentioned under (b), a compound of Formula 3 is reacted with a reactive derivative, preferably a halide, of a carboxylic acid of the kind defined above, advantageously in a high boiling inert organic solvent, if necessary in the presence of an acid-binding agent.

The resulting products corresponding to above Formula 1 are valuable red to violet pigments which are distinguished by their good temperature stability, and more especially by their good fastness to light and to migration. This is of special value to the so-called pigment printing, that is to say printing processes in which a pigment is fixed with a suitable adhesive such as casein, a hardenable plastic material, more especially a condensation product of formaldehyde with urea or melamine a solution or emulsion, of polyvinyl chloride or polyvinyl acetate or other emulsions (for example oil-in-water or water-in-oil emulsions) on a substratum, more especially on a textile fiber, or on any other flat structure such as paper (for example wallpaper) or glass fiber fabrics. The pigments are also suitable for other applications, for example in a finely dispersed form for dyeing rayon of viscose or of cellulose ethers or esters, or synthetic fibers of superpolyamides or superpolyurethanes in the spinning solution, as well as for the manufacture of colored lacquers or lacquer formers, solutions and products of acetylcellulose, nitrocellulose, natural or synthetic resins such as polymerization resins (for example polyvinyl chloride or polystyrene) or condensation resins, for example aminoplasts or phenoplasts, or polyethylene, polyacrylic products, gums, casein, silicone and silicone resins. Furthermore, they can be used with advantage for the manufacture of color pencils, cosmetics or laminates.

By virtue of their chemical inertness and good temperature stability the pigments of this invention can be dispersed in the usual manner in compositions of the kinds mentioned above, such incorporation being advantageously carried out at a stage before the composition has been given its ultimate shape. The operations required for shaping, such as spinning, moulding, hardening, casting, cementing and the like can then be carried out in the presence of the present pigments.

When the pigments to be used in the present process are not in a finely dispersed form and/or in the modification particularly suitable for their application, it is advisable to condition them prior to their application, for example by grinding them in the dry form or as a paste moistened with water, advantageously in the presence of an organic solvent which may or may not be soluble in water, or by kneading or grinding the crude pigment in the presence of a solid auxiliary, such as a salt that can be washed out again. A combination of different methods may likewise produce good results. In many cases it is found advantageous to convert the crude pigment into a finely dispersed form by grinding it together with the substratum to be dyed or with a component thereof.

The following examples illustrate the invention, parts and percentages being by weight, unless otherwise indicated.

*Example 1*

A mixture of 21.9 parts of chloranil, 59.5 parts of 4-(4'-chloro)-benzoylamino - 2:5 - diethoxy - 1 - aminobenzene (prepared by reacting 4-amino-2:5-diethoxy-1-nitrobenzene with 4-chlorobenzoyl chloride and subsequently reducing the nitro compound), 24.5 parts of crystalline sodium acetate and 1600 parts by volume of ethanol is refluxed for 4 hours, filtered while still warm, washed with cold ethanol and then with hot water and dried. The resulting violet powder is 2:5-dichloro - 3:6 - di - [2':5' - diethoxy - 4' - (4" - chloro)-benzoylamino-phenylamino]-1:4-benzoquinone.

64.7 parts of this product are mixed with 480 parts by volume of nitrobenzene and 45 parts by volume of benzoyl chloride, and the whole is heated for 20 minutes at 210 to 220° C. After cooling, the pigment which precipitates in the form of violet needles is filtered off, washed successively with hot chlorobenzene, hot alcohol and hot water and dried. The violet pigment, which has a superficial grey-green bronze sheen, is 2:6-di-[4'-chlorobenzoylamino] - 3:7 - diethoxy - 9:10 - dichloro-triphene dioxazine. It is insoluble in boiling chlorobenzene; when applied in a finely disperse form it dyes polyvinyl chloride foils strong violet tints of very good fastness to migration and to light.

In the following table are listed further products having similar tinctorial properties obtained in the manner described above. The base used instead of 4-(4'-chloro)-benzoylamino-2:5-diethoxy-1-aminobenzene is shown in column I. Column II shows the form in which the intermediate from said base and chloranil is obtained. In column III is listed the tint which polyvinyl chloride foils are dyed with the dioxazine pigment concerned.

| | I | II | III |
|---|---|---|---|
| 1 | 4-(4'-bromo)-benzoylamino-2:5-diethoxy-1-aminobenzene. | blue-violet powder. | violet. |
| 2 | 4-(4'-methoxy)-benzoylamino-2:5-diethoxy-1-aminobenzene. | pale-violet powder. | Do. |
| 3 | 4-(4'-phenyl)-benzoylamino-2:5-diethoxy-1-aminobenzene. | dull violet powder. | Do. |
| 4 | 4-(4'-bromo)-benzoylamino-2:5-dimethoxy-1-aminobenzene. | red violet powder. | blue. |
| 5 | 4-(4'-methyl)-benzoylamino-2:5-dimethoxy-1-aminobenzene. | pale-violet powder. | Do. |
| 6 | 4-(2'-bromo)-benzoylamino-2:5-diethoxy-1-aminobenzene. | violet powder. | violet. |
| 7 | 4-(4'-chloro)-benzoylamino-2-methoxy-5-methyl-1-amino-benzene. | brown powder. | claret. |

*Example 2*

A mixture of 70 parts of 2:5-diethoxy-4-(2':5'-dichlorobenzoylamino)-1-aminobenzene, 23 parts of chloranil and 28.5 parts of crystalline sodium acetate in 800 parts by volume of ethanol is refluxed at the boil for 5 to 10 hours, suction-filtered while still warm, washed successively with cold ethanol and hot water and dried. The resulting violet powder is 2:5-dichloro-3:6-bis-[2':5'-diethoxy - 4'-(2":5" - dichloro) - benzoylamino - phenylamino]-1:4-benzoquinone.

30 parts of this product are mixed with 21 parts by volume of benzoyl chloride and heated in 450 parts by volume of ortho-dichlorobenzene for 15 hours at 170 to 175° C. At 120 to 130° C. the dyestuff is suctioned off, successively washed with hot ortho-dichlorobenzene, hot alcohol and hot water, and then dried. This product, 2:6-di-(2':5'-dichloro-benzoylamino)-3:7-diethoxy-9:10-dichloro-triphene dioxazine, is a violet powder having a superficial bronze sheen; in a finely disperse form it dyes polyvinyl chloride foils violet tints of very good fastness to light and migration.

The following table lists further products that possess similar tinctorial properties and are prepared as described above. In column I is shown the base used instead of 4 - (4' - chloro) - benzoylamino - 2:5 - diethoxy-1-aminobenzene. In column II is shown the form in which the intermediate from said base and chloranil is obtained. Column III shows the tint obtained with the dioxazine pigment on polyvinyl chloride foils.

| | I | II | III |
|---|---|---|---|
| 1 | 4-(2':4'-dichloro)-benzoylamino-2:5-diethoxy-1-aminobenzene. | blue-violet powder. | blue. |
| 2 | 4-(2':5'-dichloro)-benzoylamino-2:5-dimethoxy-1-aminobenzene. | | violet. |
| 3 | 4-(2':4'-dichloro)-benzoylamino-2:5-dimethoxy-1-aminobenzene. | | Do. |
| 4 | 4-α-naphthoylamino-2:5-diethoxy-1-aminobenzene. | brown-violet powder. | Do. |

*Example 3*

25 parts of 2:5-dichloro-3:6-bis-[4'-(4"-chlorobenzoylamino)-phenylamino]-benzoquinone (prepared by condensing chloranil and 4-(4'-chlorobenzoylamino)-aniline in alcohol in the presence of sodium acetate) in 300 parts of nitrobenzene are kept with 20 parts of benzoyl chloride for 8 hours at a slight boil. The reaction mixture is allowed to cool, suction-filtered, and the resulting 2:6-bis-(4' - chlorobenzoylamino) - 9:10 - dichloro - triphene dioxazine is washed with alcohol and water and then dried. It is a powder with a metallic sheen; in finely dispersed form it dyes polyvinyl chloride foils claret tints.

*Example 4*

A mixture of 24.6 parts of chloranil, 60.4 parts of 4-(4'-methoxy) - benzoylamino - 2:5 - dimethoxy-1-aminobenzene (prepared by reacting 4 - amino - 2:5 - dimethoxy-1-nitrobenzene with 4-methoxy-benzoyl chloride and subsequently reducing the nitro compound), 27.2 parts of crystalline sodium acetate and 1600 parts by volume of ethanol is refluxed for 12 hours, filtered while still warm, washed with ethanol and then with water, and dried. The violet powder obtained in this matter is 2:5-dichloro-3:6 - di - [2':5' - dimethoxy - 4' - (4''' - methoxy)-benzoylamino-phenylamino]-1:4-benzoquinone.

A mixture of 38.8 parts of this product with 175 parts by volume of nitrobenzene and 34 parts by volume of 4-methoxy-benzoyl chloride is heated for 1 hour at 210 to 220° C. After cooling, the pigment which precipitates in rhombic flakes is filtered off, successively washed with hot chlorobenzene, hot alcohol and hot water and dried. The pigment, having a green bronze sheen, is 2:6-di-[4'-methoxy - benzoylamino] - 3:7-dimethoxy-9:10-dichloro-triphene dioxazine, of which only traces pass into solution in boiling chlorobenzene. In a finely disperse form it dyes polyvinyl chloride foils strong, bluish violet tints of very good fastness to migration and to light.

When, instead of 60.4 parts of 4-(4'-methoxy)-benzoylamino - 2:5 - dimethoxy - 1 - aminobenzene, an equivalent amount of 4 - (4' - methoxy)-benzoylamino-2-methoxy-1-aminobenzene is used, otherwise proceeding as described above, a claret colored pigment is obtained of which likewise only traces are soluble in boiling chlorobenzene. In a finely disperse form it dyes polyvinyl chloride foils strong claret tints of good fastness to migration and very good fastness to light.

*Example 5*

A mixture of 49.2 parts of chloranil, 79.2 parts of 1-amino-2:5-dimethoxy-4-nitrobenzene, 68 parts of crystalline sodium acetate and 500 parts by volume of ethanol is refluxed for 24 hours. The solid reaction product is allowed to cool, filtered off, washed with ethanol and water and then reduced with hydrosulfite in dilute sodium hydroxide solution at 50 to 70° C. By injecting air into the resulting filtered reducing solution 2:5-dichloro-3:6-di - (2':5' - dimethoxy-4'-aminophenylamino)-1:4-benzoquinone can be precipitated therefrom. After having been filtered off, washed with water and dried it forms a bluish black powder.

15.3 parts of this product are mixed with 100 parts by volume of nitrobenzene and 31.5 parts by volume of 4-chlorobenzoyl chloride, and the whole is heated for 15 minutes at 210 to 220° C. After cooling, the pigment, which precipitates in small crystalline scales, is filtered off, purified by being successively washed with hot chlorobenzene, hot alcohol and hot water, and then dried. The pigment which has a green bronze sheen is 2:6-di-(4'-chlorobenzoylamino) - 3:7 - dimethoxy - 9:10-dichloro-triphene dioxazine. It is extremely sparingly soluble in boiling chlorobenzene. In a finely disperse form it dyes polyvinyl chloride foils strong pure blue tints of very good fastness to migration and light.

*Example 6*

A mixture of 100 parts of 2-ethoxy-4-(2':5'-dichlorobenzoylamino) - 5 - chloro - 1 - aminobenzene, 34 parts of chloranil and 45 parts of crystalline sodium acetate in 1200 parts by volume of alcohol is refluxed at the boil for 5 to 10 hours, then cooled, suction-filtered, and the filter residue is washed with alcohol and with water. The brownish violet powder thus obtained is 2:5-dichloro-3:6-bis - [2' - ethoxy - 4' - (2''':5''-dichloro)-benzoylamino-5'-chlorophenylamino]-1:4-benzoquinone.

26 parts of this product in 250 parts by volume of ortho-dichlorobenzene, in the presence of 20 parts by volume of 2:5-dichlorobenzoyl chloride, are heated for 8 hours at 170 to 175° C., suction-filtered, the filter residue is successively washed with hot ortho-dichlorobenzene, hot alcohol and hot water, and yields a dark, reddish violet powder which is 2:6-bis-[2':5'-dichlorobenzoylamino]-3:7:9:10-tetrachloro-triphene dioxazine. In a finely disperse form it dyes polyvinyl chloride foils claret tints of very good fastness to light and migration.

*Example 7*

50 parts of 2:5 - di - [2':5' - dimethoxy-4'-(2'':4''-dichloro) - benzoylamino - phenylamino]-1:4-benzoquinone (prepared by condensing benzoquinone and 2:5-dimethoxy - 4 - (2':4'-dichlorobenzoylamino)-1-aminobenzene in alcohol) are heated in 500 parts by volume of ortho-dichlorobenzene with 35 parts of 2:4-dichlorobenzoyl chloride for 15 hours at 170 to 180° C. After cooling to 100° C., the whole is filtered, and the resulting 2:6-di-(2':4'-dichlorobenzoylamino)-3:7-dimethoxy-triphene dioxazine is successively washed with hot ortho-dichlorobenzene, hot alcohol and hot water. It is a crystalline powder having a green bronze sheen. On being incorporated in finely disperse form with polyvinyl chloride it produces violet foils of very good fastness to migration and light.

*Example 8*

65 parts of polyvinyl chloride, 35 parts of dioctyl phthalate and 0.2 part of the finely disperse dyestuff obtained as described in the second paragraph of Example 1 are intimately mixed and then rolled to and fro on a two-roller calender for 7 minutes at 140° C. A violet foil is obtained which has very good fastness to light and migration.

What is claimed is:

1. A dioxazine dyestuff of the formula

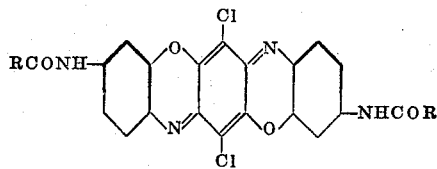

wherein R is a member selected from the group consisting of halobenzene radical, lower alkoxy benzene radical, lower alkyl benzene radical, carbocyclic aryl benzene radical, cyanobenzene radical and nitrobenzene radical.

2. A dioxazine dyestuff of the formula

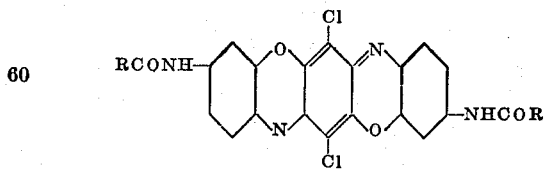

where in R is halophenyl.

3. A dioxazine dyestuff of the formula

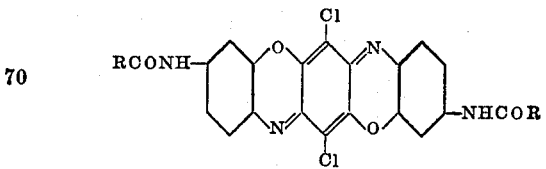

wherein R is lower alkoxy phenyl.

4. The dioxazine dyestuff of the formula
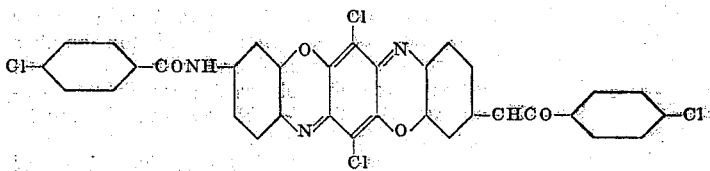
5. The dioxazine dyestuff of the formula
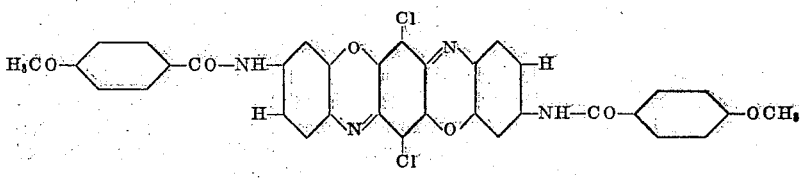
References Cited in the file of this patent
Fierz-David et al.: Helv. Chim. Acta, vol. 22, pages 1348–58 (1939).
Venkataraman: Chem. of Synthetic Dyes, vol. 1, page 339 (1952).

UNITED STATES PATENT OFFICE
CERTIFICATE OF CORRECTION

Patent No. 3,022,298 — February 20, 1962

Rudolf Mory et al.

It is hereby certified that error appears in the above numbered patent requiring correction and that the said Letters Patent should read as corrected below.

Column 6, lines 57 to 64, the formula should appear as shown below instead of as in the patent:

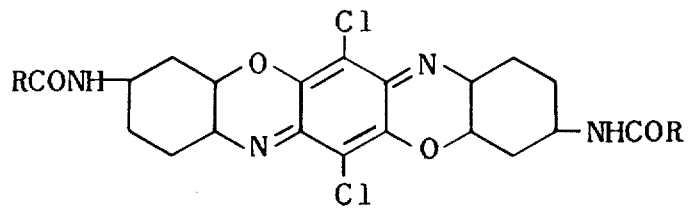

columns 7 and 8, the formula in claim 4 should appear as shown below instead of as in the patent:

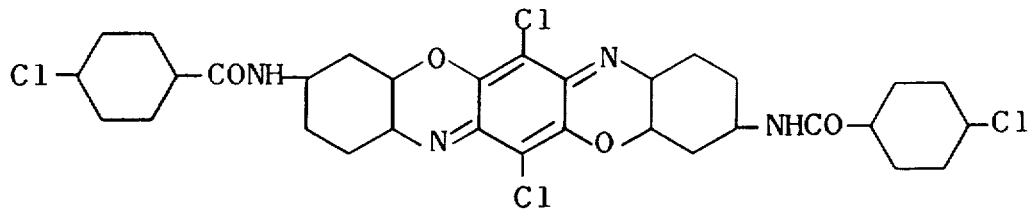

Signed and sealed this 11th day of September 1962.

(SEAL)
Attest:

ERNEST W. SWIDER
Attesting Officer

DAVID L. LADD
Commissioner of Patents